(12) United States Patent
Marsacq et al.

(10) Patent No.: US 7,763,391 B2
(45) Date of Patent: Jul. 27, 2010

(54) ALKALI FUEL CELL UNAFFECTED BY CARBONATION

(75) Inventors: Didier Marsacq, Grenoble (FR); Christel Roux, Saint-Quentin-sur Isere (FR); Max Perrin, Le Fontanil Cornillon (FR); John A. Brunea, Uccle (BE)

(73) Assignee: Commissariat a l'Energie Atomique, Paris (FR)

( * ) Notice: Subject to any disclaimer, the term of this patent is extended or adjusted under 35 U.S.C. 154(b) by 564 days.

(21) Appl. No.: 10/582,271

(22) PCT Filed: Dec. 2, 2004

(86) PCT No.: PCT/FR2004/003092

§ 371 (c)(1),
(2), (4) Date: Jun. 9, 2006

(87) PCT Pub. No.: WO2005/069413

PCT Pub. Date: Jul. 28, 2005

(65) Prior Publication Data

US 2007/0128500 A1    Jun. 7, 2007

(30) Foreign Application Priority Data

Dec. 16, 2003   (FR) .................................. 03 14730

(51) Int. Cl.
*H01M 8/02* (2006.01)
*H01M 8/10* (2006.01)

(52) U.S. Cl. .................. 429/505; 429/480; 429/484; 429/492; 429/502

(58) Field of Classification Search .................. 429/27, 429/46, 206, 213; 526/72, 293
See application file for complete search history.

(56) References Cited

U.S. PATENT DOCUMENTS 4,374,924 A * 2/1983 Yokoyama et al. .......... 430/528

(Continued)

FOREIGN PATENT DOCUMENTS

| JP | 09-245802 | * | 9/1997 |
| WO | WO 02/35633 | * | 5/2002 |
| WO | WO 03/017396 | | 2/2003 |

OTHER PUBLICATIONS

Herman, H., Slade, R.C.T., Varcoe, J.R. "The radiation-grafting of vinylbenzyl chloride onto poly(hexafluoropropylene-co-tetrafluoroethylene) films with subsequent conversion to alkaline anion-exhange membranes; optimisation of the experimental conditions and characterisation." J. Membrane Science 218 (2003) 147-163.*

(Continued)

*Primary Examiner*—Dah-Wei D Yuan
*Assistant Examiner*—Kwang Han
(74) *Attorney, Agent, or Firm*—Oliff & Berridge, PLC

(57) ABSTRACT

An alkali fuel cell comprises a solid stack consisting of a first electrode, a solid membrane conducting hydroxide ions and a second electrode, each electrode comprising an active layer that is in contact with the solid membrane. The material forming the active layer of each electrode comprises at least a catalytic element, an electronic conductive element and an element conducting hydroxide ions. The element conducting hydroxide ions is a polymer having vinylaromatic units comprising a quaternary ammonium function and a hydroxide ion $OH^-$ is associated with each quaternary ammonium function. One such alkali fuel cell is unaffected by carbonation and maintains good electrochemical performances.

10 Claims, 3 Drawing Sheets

U.S. PATENT DOCUMENTS

| | | | | |
|---|---|---|---|---|
| 5,037,858 | A * | 8/1991 | MacDonald | 521/38 |
| 5,118,717 | A * | 6/1992 | Hodgdon et al. | 521/38 |
| 6,183,914 | B1 * | 2/2001 | Yao et al. | 429/309 |
| 6,339,038 | B1 * | 1/2002 | Tada et al. | 502/326 |
| 6,468,657 | B1 * | 10/2002 | Hou et al. | 428/403 |
| 2002/0037446 | A1 | 3/2002 | Iyer | |
| 2003/0054226 | A1 * | 3/2003 | Kaneko et al. | 429/44 |
| 2003/0059655 | A1 | 3/2003 | Iyer | |

OTHER PUBLICATIONS

Herman et al., "The radiation-grafting of vinylbenzyl chloride onto poly (hexafluoropylene) films with subsequent conversion to alkaline anion-exchange membranes: optimization of the experimental conditions and characterization," Journal of Membrane Science, vol. 218, No. 1-2, pp. 147-163, Jul. 1, 2003.

Agel et al., Characterization and use of anionic membranes for alkaline fuel cells,: Journal of Power Sources, vol. 101, pp. 267-274, 2001 w/abstract.

Agel et al., "Utilisation d'electrolyte solide polymere dans les piles a combustibles alcalines," Annales de Chimie, vol. 26, No. 4, pp. 59-68.

Ogumi et al., "Preliminary Study on Direct Alcohol Fuel Cells Employing Anion Exchnage Membrane," Electrochemistry, Technical Paper, No. 12, pp. 980-983, 2002.

* cited by examiner

ALKALI FUEL CELL UNAFFECTED BY CARBONATION

BACKGROUND OF THE INVENTION

The invention relates to an alkali fuel cell comprising a solid stack consisting of a first electrode, a solid membrane conducting hydroxide ions and a second electrode, each electrode comprising an active layer that is in contact with the solid membrane.

STATE OF THE ART

Alkali fuel cells (AFC) are generally formed by two electrodes and an electrolyte exchanging hydroxide ions, more often than not in liquid form. They are particularly interesting, for they present a certain number of advantages compared with Proton Exchange Membrane Fuel Cells (PEMFC). The oxygen reduction kinetics are thus higher for AFCs than for PEMFCs and, unlike PEMFC, catalysts made from non-noble material can be used for the electrodes of an AFC. Moreover, alkaline liquid electrolyte is a better ionic conductor than proton exchange membranes, and AFCs present higher accessible volume and mass energy densities than PEMFCs.

However, when operating with air, the performances of AFCs are generally reduced by a carbonation phenomenon of the liquid electrolyte due to the carbon dioxide ($CO_2$) present in the air. Indeed, when the AFC operates, $CO_2$ dissolves in the alkaline liquid electrolyte resulting in formation and precipitation of potassium carbonate. This phenomenon causes a reduction of the pH value of the alkaline electrolyte, reduces the kinetics of the electrochemical reactions at the level of the electrodes and impairs the performances of the electrodes. In addition, liquid electrolyte AFCs generally require a control system of the corrosive liquid electrolyte which may prove to be complex and cumbersome. Lastly, it is very difficult to use liquid fuels with AFCs for such fuels tend to diffuse through the liquid electrolyte.

To remedy these major shortcomings, it has been proposed to make use of the affinity of certain polymer membranes for the alkaline liquids such as potassium or sodium, so as to form a solid alkaline gel designed to replace the liquid electrolyte of AFCs. The presence of a liquid phase in this gel in fact fosters formation of triple point zones. What is meant by triple point zone is a zone in the alkali fuel cell enabling electronic conduction, ionic conduction and a catalytic reaction to take place. Thus, Z. Ogumi et al. in the article "Preliminary Study on Direct Alcohol Fuel Cells Employing Anion Exchange Membrane" (Electrochemistry, Technical Paper, N°12, pages 980 to 983, 2002) propose using a membrane exchanging hydroxide ions, in an alkali fuel cell operating with alcohol, that is composed of a chain with a polyolefin structure on which "quaternary ammonium" groups are bonded. The membrane exchanging hydroxide ions is impregnated with a liquid electrolyte containing ethylene glycol and methanol dissolved in an aqueous solution containing 1 mol.dm$^{-3}$ of potassium so as to form triple point zones at the level of the electrodes formed by carbon and platinum. The presence of an electrolyte in liquid form does however induce a carbonation phenomenon.

E. Agel et al., in the article "Characterization and use of anionic membranes for alkali fuel cells" (Journal of Power Sources, 101 (2001) 267-274), attempted to use polymer anionic conducting membranes without adding an alkaline liquid electrolyte. Ionic conduction is obtained by cross-linking of the polymer by means of a quaternization agent. However, in spite of the good chemical and thermal stability of such a membrane, it presents a low ionic conduction without the addition of an alkaline liquid electrolyte. An alkaline liquid then has to be added at the interfaces between the electrodes and the membrane to foster the appearance of triple point zones, the alkaline liquid then implying a carbonation phenomenon in the alkali fuel cell, which then decreases the performances of said cell.

OBJECT OF THE INVENTION

The object of the invention is to provide an alkali fuel cell that is unaffected by the carbonation phenomenon when operating with air, while presenting good performances and, more particularly, a high ionic conduction.

According to the invention, this object is achieved by the fact that the material forming the active layer of each electrode comprises at least a catalytic element, an electronic conductive element and an element conducting hydroxide ions, the element conducting hydroxide ions being a polymer having vinylaromatic units comprising a quaternary ammonium function and hydroxide counter-ions OH$^-$ being associated with the quaternary ammonium functions of the polymer.

More particularly, the element conducting hydroxide ions is a polymer having styrenic units and hydroxide counter-ions OH$^-$ are associated with the quaternary ammonium functions of the polymer.

According to a development of the invention, the element conducting hydroxide ions is a polymer having the following general formula (I):

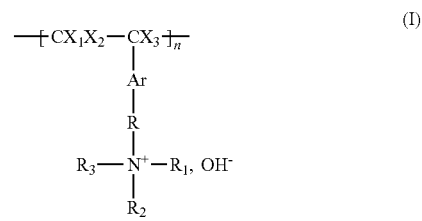

in which:

X$_1$ and X$_2$ are both chosen from the group containing hydrogen, chlorine and fluorine, X$_3$ is chosen from the group containing hydrogen, chlorine, fluorine, an alkyl and a perfluorinated alkyl, Ar represents a possibly substituted, carbonated aromatic cycle, R is chosen from —CH$_2$— and —(CF$_2$)$_{n1}$—CH$_2$—, with n1 comprised between 1 and 10, the —CH$_2$— alkyl group of R being bonded by a simple covalent bond to the nitrogen of the quaternary ammonium function, R$_1$, R$_2$ and R$_3$ are respectively identical or different alkyl, aryl or alkyl-aryl groups, and n is an integer.

According to another development of the invention, the element conducting hydroxide ions is a polymer having the following general formula (II):

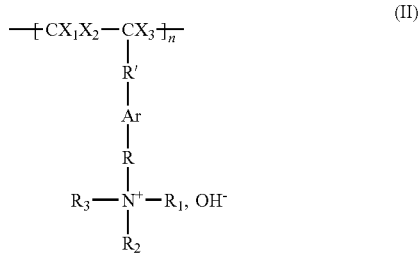

(II)

in which:
X₁ and X₂ are both chosen from the group containing hydrogen, chlorine and fluorine,
X₃ is chosen from the group containing hydrogen, chlorine, fluorine, an alkyl and a perfluorinated alkyl,
Ar represents a possibly substituted, carbonated aromatic cycle,
R is chosen from —CH₂— or —(CF₂)$_{n1}$—CH₂— with n1 comprised between 1 and 10, the —CH₂— alkyl group being bonded by a simple covalent bond to the nitrogen of the quaternary ammonium function,
R' is chosen from the group comprising oxygen, the —O—CF₂ group, and
(CF₂)$_{n2}$— with n2 comprised between 1 and 10,
R₁, R₂ and R₃ are respectively identical or different alkyl, aryl or alkyl-aryl groups,
n is an integer.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
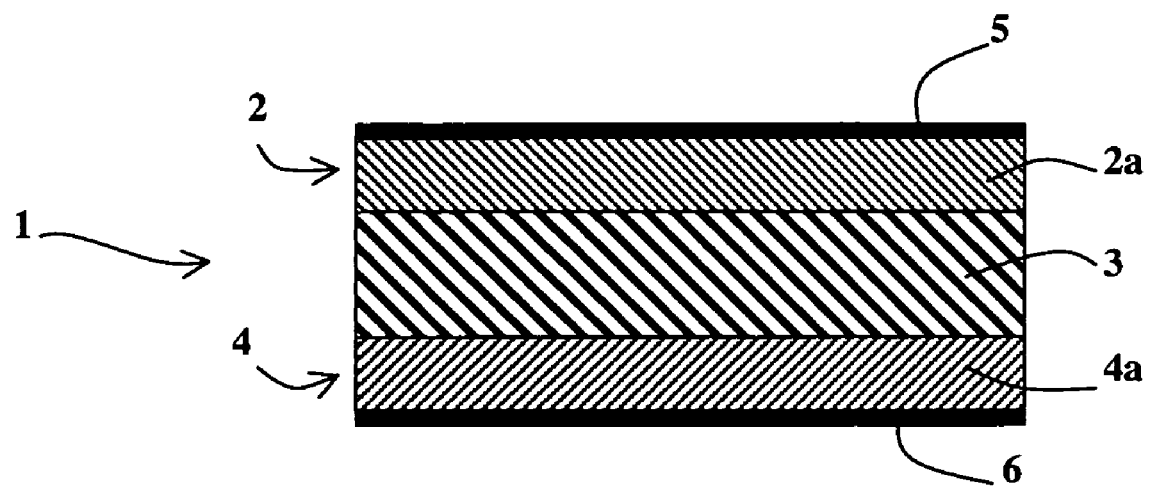
FIGS. 1 and 2 respectively represent schematic cross-sectional views of first and second embodiments of an alkali fuel cell according to the invention.
Figure 2:
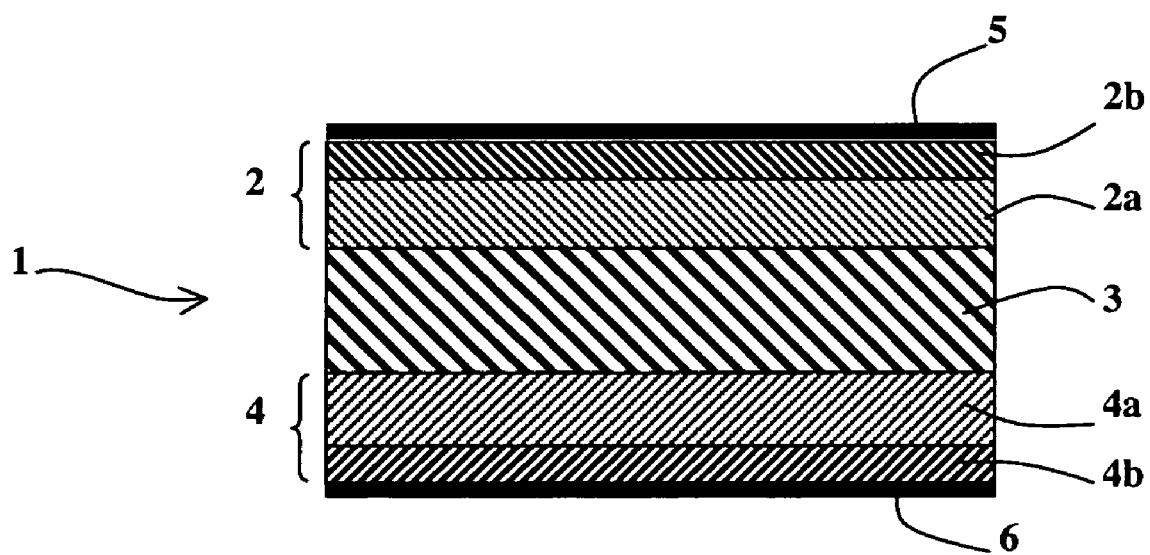

As represented in FIG. 1, an alkali fuel cell 1 according to the invention comprises at least one solid stack consisting of a first electrode 2, a solid membrane 3 conducting hydroxide ions and a second electrode 4, first and second current collectors 5 and 6 being respectively arranged on the first and second electrodes 2 and 4. The first and second electrodes 2 and 4 respectively comprise first and second active layers 2a and 4a in contact with the solid membrane 3 and possibly first and second diffusion layers 2b and 4b, as represented in FIG. 2.

The solid membrane 3 conducting hydroxide ions is chosen from any type of solid membrane known to be able to conduct hydroxide ions. It preferably has an ionic conductivity greater than or equal to 0.005 S/cm. For example, the solid membrane 3 can be a membrane formed by a film of tetrafluoroethylene (TFE) with a thickness of 50 μm, radiochemically grafted by chloromethylstyrene, cross-linked by divinylbenzene then amine treated. The current collectors are formed by any type of known material in the field of alkali fuel cells.

According to the invention, the first and second active layers 2a and 4a are both formed by a material containing at least a catalytic element, an electronic conductive element and an element conducting hydroxide ions. The active layers thus constituted then form triple point zones, i.e. zones where an ionic conduction, an electronic conduction and a catalytic reaction all take place, without an alkaline liquid having to be added to the alkali fuel cell.

The electronic conductive element is preferably chosen from the group comprising carbon, nickel, silver, gold and platinum whereas the catalytic element can be made from platinum, silver or any other type of material, preferably non-noble and known to act as catalyst of the electrochemical reactions involved in an AFC type cell. In particular embodiments, the catalytic element can be formed by the electronic conductive element or the electronic conductive element is the support of the catalytic element and of the element conducting hydroxide ions and is in the form of a fabric, a foam or a powder.

The element conducting hydroxide ions of the active layer of each electrode is a polymer having vinylaromatic units comprising a quaternary ammonium function and hydroxide counter-ions OH⁻ are associated with the quaternary ammonium functions of the polymer. The vinylaromatic-based polymer can be a homopolymer formed from a single vinylaromatic monomer or a copolymer formed from a vinylaromatic monomer and at least one other monomer. More particularly, the element conducting hydroxide ions of the active layer is a polymer having styrenic units comprising a quaternary ammonium function and hydroxide counter-ions OH⁻ are associated with the quaternary ammonium functions of the polymer. What is meant by polymer having styrenic units is a carbonated main chain repeating itself n times and containing at least two carbons bonded together by a simple covalent bond, a side chain containing at least one aromatic cycle being attached to said carbonated main chain. In addition, the hydroxide counter-ions associated with the quaternary ammonium functions of the polymer ensure ionic conduction from one electrode to a second electrode through the solid membrane conducting hydroxide ions.

According to a particular embodiment, the element conducting hydroxide ions is a polymer having the following general formula (I):

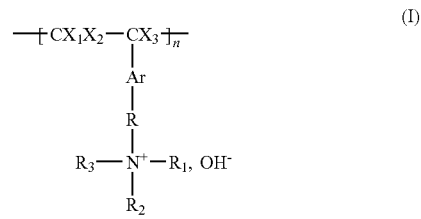

(I)

in which:
X₁ and X₂ are both chosen from the group containing hydrogen, chlorine and fluorine whereas X₃ is chosen from the group containing hydrogen, chlorine, fluorine, an alkyl and a perfluorinated alkyl, Ar represents a possibly substituted, carbonated aromatic cycle, R is chosen from —$CH_2$— and —$(CF_2)_{n1}$—$CH_2$—, with n1 comprised between 1 and 10, the —$CH_2$— alkyl group of R being bonded by a simple covalent bond to the nitrogen of the quaternary ammonium function, $R_1$, $R_2$ and $R_3$ are respectively identical or different alkyl, aryl or alkyl-aryl groups, and n is an integer.

Thus, in each styrenic unit of the general formula (I), the side chain, attached to the carbonated main chain $CX_1X_2$—$CX_3$ by the carbonated aromatic cycle Ar, comprises at its free end a quaternary ammonium function "—$N^+R_1R_2R_3$", an R group being arranged between the carbonated aromatic cycle Ar and the quaternary ammonium function.

In an alternative embodiment, the element conducting hydroxide ions can also be a polymer having the following general formula (II):

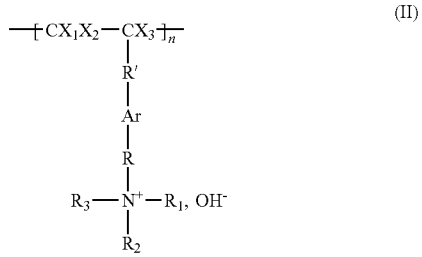

(II)

The general formula (II) only differs from the general formula (I) by the fact that a group R' is arranged between the group Ar and the main chain —$(CX_1X_2$—$CX_3)$—, the group R' being chosen from the group containing oxygen, the group —O—$CF_2$, and —$(CF_2)_{n2}$— with n2 comprised between 1 and 10.

The presence of the element conducting hydroxide ions in the active layer of each electrode enables both ionic conduction, electronic conduction and a catalytic effect to be obtained in the fuel cell, thus making the latter insensitive to the carbonation phenomenon. Moreover, the element conducting hydroxide ions ensures the ionic continuity between the solid membrane and the catalytic element of each electrode and enables diffusion of the fuels to the catalytic element.

For example, the element conducting hydroxide ions of the active layer of each electrode can be the polymer with the following semi-developed formula (III):

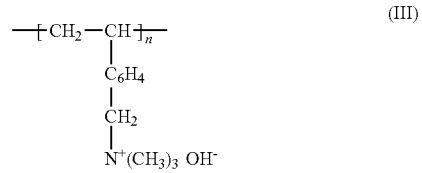

(III)

The group —$CH_2$—$N^+(CH_3)_3$ can be placed indifferently in ortho, meta or para position on each aromatic group —$C_6H_4$— of the polymer.

It is preferably obtained according to the following reaction scheme:

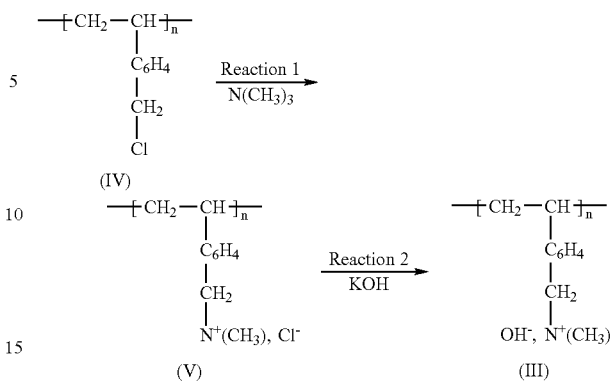

In this way, when a first reaction (reaction 1) takes place, the compound of formula (V) is obtained from trimethylamine ($N(CH_3)_3$) and a soluble precursor of semi-developed formula (IV) called polyvinylbenzochloride (PVBC), so as to replace the chlorine atom of the precursor of semi-developed formula (IV) by the quaternary ammonium function $N^+(CH_3)_3$ and the counter-ion $Cl^-$. The counter-ion $Cl^-$ of the compound of semi-developed formula (V) is then replaced by a hydroxide ion $OH^-$ in the reaction 2, so as to form the compound of semi-developed formula (III) constituting the element conducting hydroxide ions of the active layer of each electrode.

Thus, for example, a first method for producing the active layer of an electrode consists in impregnating a catalytic element in solid form with a solution containing the soluble precursor of semi-developed formula (IV). During this step, the precursor of formula (IV) deposits on each grain of the catalytic element, then the assembly reacts with a trimethylamine to form the compound of semi-developed formula (V), according to the reaction 1. The compound of semi-developed formula (V), containing the quaternary ammonium function, then undergoes treatment in a base according to the reaction 2, and then in distilled water so as to obtain the compound of formula (III).

In a second method for producing the active layer, the catalytic element in the form of grains can be dispersed in a solvent. A mixing step then enables the catalytic element and the soluble precursor of formula (IV) to be brought into contact. The soluble precursor of formula (IV) is first of all mixed in solution in a solvent identical to the one in which the catalytic element was dispersed. In the course of the mixing step, the mixture then forms a dispersion in which the soluble precursor of semi-developed formula (IV) deposits on each grain of the catalytic element. The dispersion is then used to form the active layer, by any type of known means for achieving fuel cell electrodes. The active layer thus formed is successively immersed in a solution containing trimethylamine (reaction 1) then in an alkaline solution (reaction 2) and in distilled water so as to form the element conducting hydroxide ions having the semi-developed formula (III). In an alternative embodiment, the reaction 1 undergone by the precursor of formula (IV) can made to take place before the mixing step, so that the catalytic element is placed directly in contact with the compound of formula (V).

According to another alternative embodiment, the catalytic element associated with the precursor of formula (IV) can be deposited on the solid membrane before the reactions 1 and 2 take place. The membrane on which the catalyst element is deposited is then called a Catalyst Coated Membrane (CCM).

It can also be applied on the diffusion layer of the electrode, which is for example porous or fibrous and which forms a Gas Diffusion Electrode. The precursor of formula (IV) can also be cross-linked by means of monoamines or diamines so as to form a cross-linked binder.

In this way, the presence within the active layer of the electrodes of such an element conducting hydroxide ions and of a solid membrane exchanging hydroxide ions enables a solid electrode-membrane-electrode assembly of high performance to be obtained without adding any alkaline liquid, thus preventing the carbonation phenomenon. This enables an alkali fuel cell to be produced that presents good performances while being unaffected by the carbonation phenomenon when operating with air.

Figure 3:
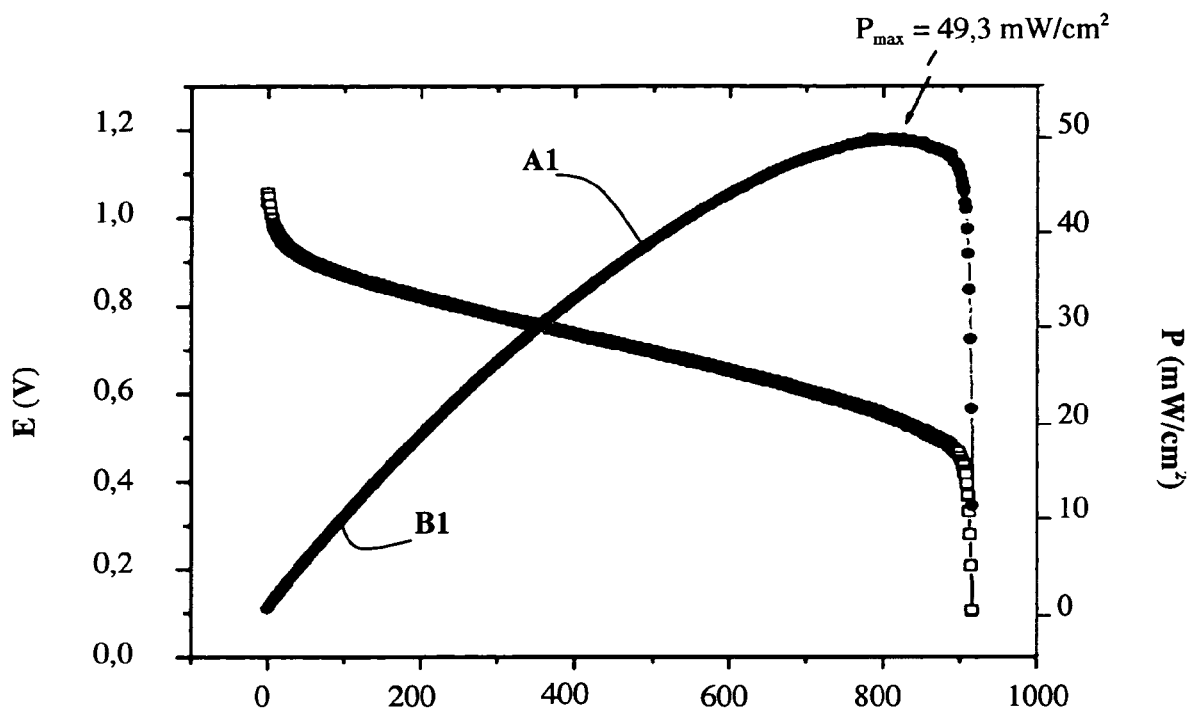
FIGS. 3 and 4 represent the electrochemical behavior of an alkali fuel cell with liquid electrolyte according to the prior art, respectively when the cell is put into operation and after 48 hours of operation.
Figure 4:
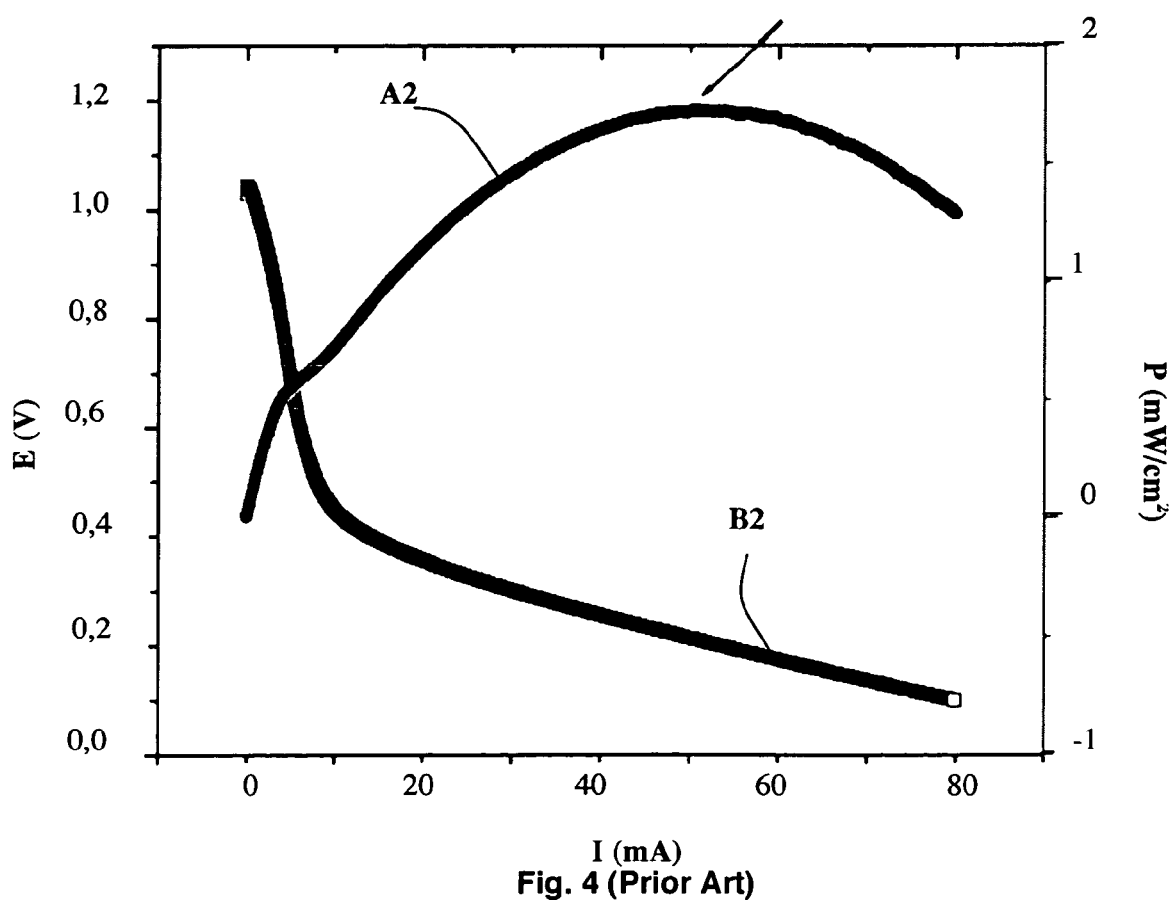
Figure 5:
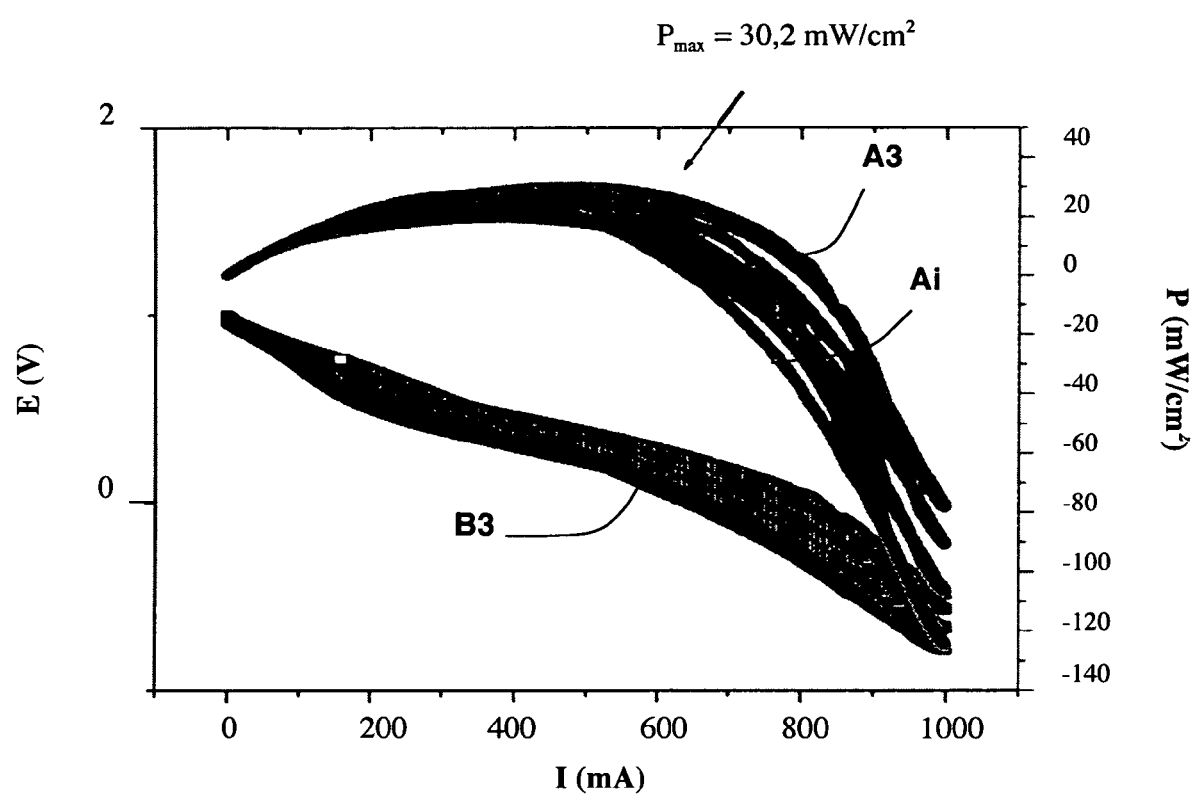
FIG. 5 represents the evolution in time of the electrochemical behavior of an alkali fuel cell according to the invention.

Indeed, as represented in FIGS. 3 to 5, the electrochemical performances of an alkali fuel cell with liquid electrolyte according to the prior art (FIGS. 3 and 4), have been compared with those of an alkali fuel cell according to the invention (FIG. 5). The electrochemical performances of each cell are represented by the curves "A" and "B" respectively representing the evolution of the voltage E versus the current I and the evolution of the power P versus the current I.

Thus, the curves A1 and A2 of the alkali fuel cell with liquid electrolyte according to the prior art represent the evolution of the electrochemical power of the cell versus the current, respectively when the cell is put into operation and after 48 hours of operation. The two curves A1 and A2 show that the maximum power obtained drops from 50 mW/cm$^2$ to about 2mW/cm$^2$ after 48 hours of operation, which indicates the presence of carbonation of the alkaline electrolyte. In FIG. 5, the set of curves A3 to A1 each represent the power versus the current for different operating times of the alkali fuel cell. The curves A3 to A1 show that the maximum power of the alkali fuel cell according to the invention remains stable in time. The cell according to the invention therefore does not undergo a carbonation phenomenon during its operation, unlike the alkali fuel cell according to the prior art.

The invention claimed is:

1. Alkali fuel cell comprising a solid stack consisting of
a first electrode,
a hydroxide ion conducting solid membrane, and
a second electrode, wherein
each of the first electrode and the second electrode comprise an active layer that is in contact with the solid membrane,
the material forming the active layer of each of the first electrode and the second electrode comprises at least a catalytic element, an electronic conductive element and an element conducting hydroxide ions,
the element conducting hydroxide ions of the active layer of each of the first electrode and the second electrode being a polymer having vinylaromatic units comprising a quaternary ammonium function and hydroxide counter-ions OH$^-$ being associated with the quaternary ammonium functions of the polymer, and
the fuel cell not comprising any alkaline liquid.

2. Cell according to claim 1, wherein the element conducting hydroxide ions is a polymer having styrenic units comprising a quaternary ammonium function and hydroxide counter-ions OH$^-$ are associated with the quaternary ammonium functions of the polymer.

3. Cell according to claim 2, wherein the element conducting hydroxide ions is a polymer having the following general formula (I):

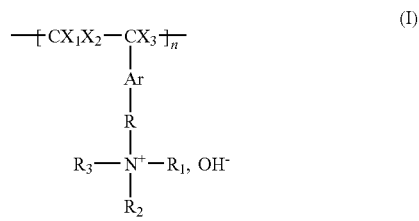

in which:
X$_1$ and X$_2$ are both selected from the group consisting of hydrogen, chlorine and fluorine,
X$_3$ is selected from the group consisting of hydrogen, chlorine, fluorine, an alkyl and a perfluorinated alkyl,
Ar represents a substituted or unsubstituted, carbonated aromatic cycle,
R is selected from the group consisting of —CH$_2$— and —(CF$_2$)$_{n1}$—CH$_2$—, with n1 comprised between 1 and 10, the —CH$_2$— alkyl group of R being bonded by a simple covalent bond to the nitrogen of the quaternary ammonium function,
R$_1$, R$_2$ and R$_3$ are respectively identical or different alkyl, aryl or alkyl-aryl groups,
and n is an integer.

4. Cell according to claim 2, wherein the element conducting hydroxide ions is a polymer having the following general formula (II):

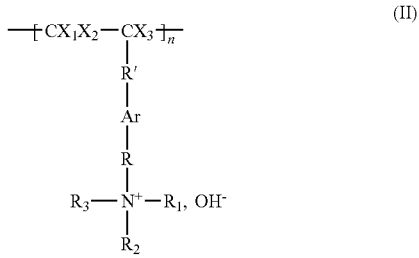

in which:
X$_1$ and X$_2$ are both selected from the group consisting of hydrogen, chlorine and fluorine,
X$_3$ is selected from the group consisting of hydrogen, chlorine, fluorine, an alkyl and a perfluorinated alkyl,
Ar represents a substituted or unsubstituted, carbonated aromatic cycle,
R is selected from the group consisting of —CH$_2$— or —(CF$_2$)$_{n1}$—CH$_2$— with n1 comprised between 1 and 10, the —CH$_2$— alkyl group being bonded by a simple covalent bond to the nitrogen of the quaternary ammonium,
R' is selected from the group consisting of oxygen, the —O—CF$_2$ group, and —(CF$_2$)$_{n2}$— with n2 comprised between 1 and 10,
R$_1$, R$_2$ and R$_3$ are respectively identical or different alkyl, aryl or alkyl-aryl groups, n is an integer.

5. Cell according to claim 1, wherein the electronic conductive element is selected from the group consisting of carbon, nickel, silver, gold and platinum.

6. Cell according to claim 1, wherein the catalytic element is selected from the group consisting of platinum and silver.

7. Cell according to claim 1, wherein the catalytic element comprises the electronic conductive element.

8. Cell according to claim 1, wherein the electronic conductive element being the support of the catalytic element and of the element conducting hydroxide ions, it is in the form of a fabric, a foam, a powder or a grid.

9. Cell according to claim 1, wherein the ionic conductivity of the solid membrane conducting hydroxide ions is greater than or equal to 0.005 S/cm.

10. Cell according to claim 1, wherein each of the first electrode and the second electrode comprise a diffusion layer so that the active layer is arranged between the diffusion layer and the solid membrane.

* * * * *